(12) United States Patent
Feekes, Jr.

(10) Patent No.: US 7,694,075 B1
(45) Date of Patent: Apr. 6, 2010

(54) SYSTEM FOR ENABLING AND DISABLING CACHE AND A METHOD THEREOF

(75) Inventor: Dan Gerrit Feekes, Jr., Lafayette, CO (US)

(73) Assignee: GlobalFoundries Inc.

( * ) Notice: Subject to any disclaimer, the term of this patent is extended or adjusted under 35 U.S.C. 154(b) by 1163 days.

(21) Appl. No.: 11/076,323

(22) Filed: Mar. 9, 2005

(51) Int. Cl.
*G06F 12/08* (2006.01)

(52) U.S. Cl. .................. 711/119; 711/120; 711/128

(58) Field of Classification Search .......... 711/122, 711/138, 128, 135, 167, 118, 119
See application file for complete search history.

(56) References Cited

U.S. PATENT DOCUMENTS

| | | | |
|---|---|---|---|
| 5,586,296 A * | 12/1996 | Bernstein et al. | 711/138 |
| 5,625,793 A * | 4/1997 | Mirza | 711/138 |
| 6,282,614 B1 * | 8/2001 | Musoll | 711/122 |
| 6,442,652 B1 * | 8/2002 | Laboy et al. | 711/138 |
| 6,981,112 B2 * | 12/2005 | Christofferson et al. | 711/156 |
| 7,228,388 B2 * | 6/2007 | Hu et al. | 711/138 |
| 2006/0112233 A1 * | 5/2006 | Hu et al. | 711/138 |

* cited by examiner

*Primary Examiner*—Pierre-Michel Bataille

(57) ABSTRACT

A second cache (e.g., L2 cache) is enabled or disabled based at least in part on an utilization of a first cache (e.g., L1 cache). The utilization of the first cache may be interpreted as an estimation of the likely utilization of the second cache. The utilization may be estimated by monitoring, for example, the eviction rates of the first cache or other caches, by monitoring the proportion of ways of the first cache used by an instruction stream, or by monitoring the duration between certain instructions executed by the processor, such as the duration between suspend operations.

26 Claims, 4 Drawing Sheets

SYSTEM FOR ENABLING AND DISABLING CACHE AND A METHOD THEREOF

FIELD OF THE DISCLOSURE

The present disclosure relates generally processor cache and more particularly to enabling and disabling cache based on cache utilization.

BACKGROUND

Processor architectures conventionally utilize a hierarchy of cache when executing instructions or processing data. Typically, lower level caches, such as L0 or L1 cache, are implemented as relatively low storage capacity but relatively fast caches, whereas higher level caches, such as L2 cache, are implemented as relatively high storage capacity but relatively slow caches. When an instruction pipeline or data pipeline requires instructions or data for processing, each cache typically is checked in a hierarchical sequence until the instructions or data are found or until it becomes necessary to go to system memory to obtain the sought-for instructions or data. As cache accesses typically have a significantly smaller time penalty than external memory accesses, this hierarchical cache approach has the advantage of minimizing processing delays when the sought-for data frequently is in the cache (i.e., there is a high hit rate for the cache). However, in instances where the sought-for data is frequently not found in the cache (i.e., there is a low hit rate for the cache), this hierarchical cache approach results in additional delays as unfruitful searches are made of the caches before the processor resorts to accessing the data from external memory. Moreover, these higher level caches consume power regardless of their effective utilization, therefore causing an unnecessary power draw when such caches are underutilized.

Accordingly, a technique for minimizing the delays and power consumption caused by higher level caches would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving the enabling and disabling of cache based at least in part on cache utilization. It is understood, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

FIGS. 1-8 illustrate various exemplary techniques for enabling and disabling higher level cache based on predicted or estimated utilization of the higher level cache or lower level caches. In one embodiment, the utilization of a lower level cache is monitored and, depending on its utilization, a higher-level cache may be enabled or disabled so as to reduce or minimize the power consumption of the higher level cache, as well as to reduce or eliminate the latency involved with an unfruitful search of the higher level cache for sought-for data. The utilization of the lower level cache may be monitored by, for example, monitoring a relative frequency of suspend operations, monitoring the cache hit rate for one or more of the lower level caches, monitoring the eviction rates of one or more of the lower level caches, or monitoring the proportion of ways of the lower level cache utilized by the processor to the overall number of ways of the lower level cache.

Figure 1:
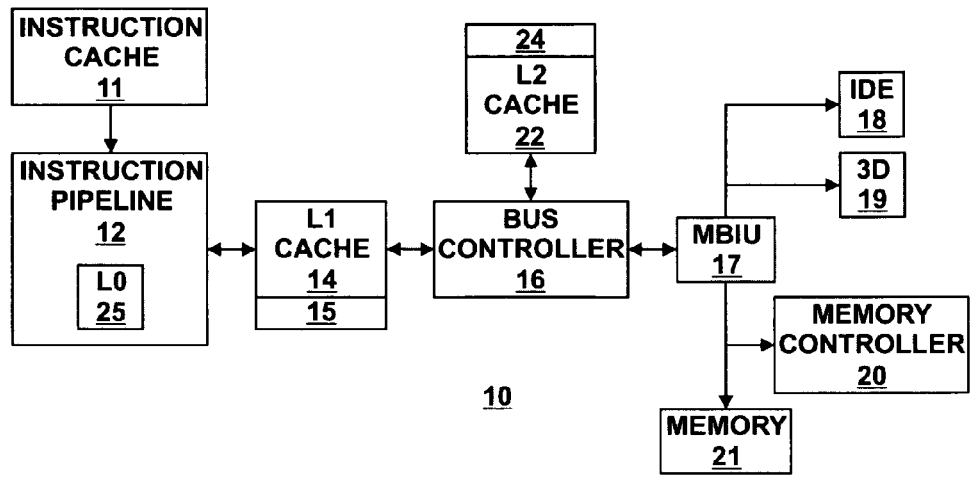
FIG. 1 is a block diagram of an exemplary processor having multiple caches in accordance with at least one embodiment of the present disclosure.

Referring now to FIG. 1, an exemplary processor 10 is illustrated in accordance with at least one embodiment of the present disclosure. The processor 10 includes an instruction cache 11, an instruction pipeline 12, a level one (L1) cache 14, an L1 cache manager 15, a bus controller 16, a master bus interface unit (MBIU) 17, and a plurality of devices coupled to a master bus, such as, for example, an IDE controller 18, a 3-D coprocessor 19, a memory controller 20 and system memory 21. The processor 10 further comprises a level two (L2) cache 22 and L2 cache manager 24 and the instruction pipeline 12 further may comprise a level zero (L0) cache 25. For ease of illustration, the exemplary techniques of the present disclosure are described in the context of caching for the instruction pipeline 12. However, these techniques also may be implemented for a data pipeline (not shown) of the processor 10 using the guidelines provided herein without departing from the spirit or the scope of the present disclosure.

In operation, various prediction techniques may be used to populate the caches 14, 22 and 25 with instruction data based on an instruction stream provided by the instruction cache 11 and executed by the instruction pipeline 12. In instances wherein the instruction pipeline 12 requires instruction data that is not found in, for example, its L0 cache 25, the instruction pipeline 12 first attempts to locate the instruction data in the L1 cache 14. In the event that the L1 cache 14 does not have the instruction data, the instruction pipeline 12 then attempts to locate the instruction data in the L2 cache 22. In the illustrated example, the instruction pipeline 12 is connected to the L2 cache 22 via the bus controller 16. In the event that the L2 cache 22 does not have the instruction data, system memory 21 is searched via the memory controller 20. It will be appreciated that the search of the L2 cache 22 causes an additional delay in instances where the instruction data is not in the L2 cache 22. Should the hit rate of the L2 cache 22 fall below a certain level, the average latency of instruction data access with the L2 cache 22 enabled becomes greater than the average latency of instruction data accesses without the use of any L2 cache 22. Accordingly, the L2 cache 22 may be enabled or disabled so as to reduce or minimize the power consumption of the L2 cache 22, as well as to reduce or eliminate the latency involved with an unfruitful search of the L2 cache 22 for sought-for data.

In at least one embodiment, the advantage or disadvantage in disabling the L2 cache 22 is estimated by monitoring the utilization of one or more lower level caches, such as the L1 cache 14 or the L0 cache 25. The likely utilization of the higher level caches may be estimated or predicted from the utilization of the lower level caches. The utilization of the lower level cache may be monitored by, for example, monitoring a relative frequency of suspend operations, monitoring the cache hit rate for one or more of the lower level caches, monitoring the eviction rate of one or more of the lower level caches, or monitoring the proportion of ways of the lower level cache utilized by the processor to the overall number of ways of the lower level cache. These exemplary monitoring techniques are discussed in greater detail with reference to FIGS. 2-8.

Figure 2:
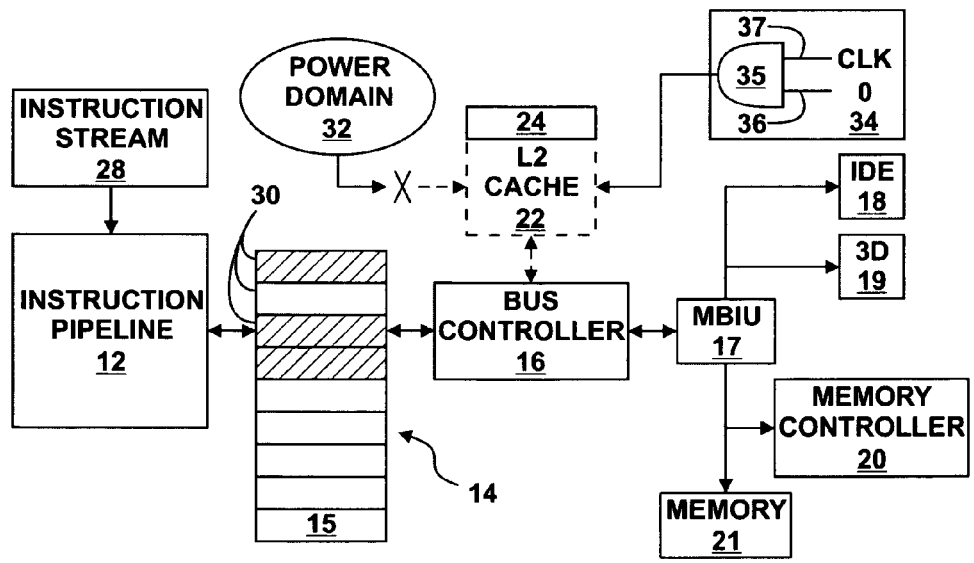
FIG. 2 is a block diagram of the exemplary processor of FIG. 1 during a lower utilization of a lower level cache in accordance with at least one embodiment of the present disclosure.
Figure 3:
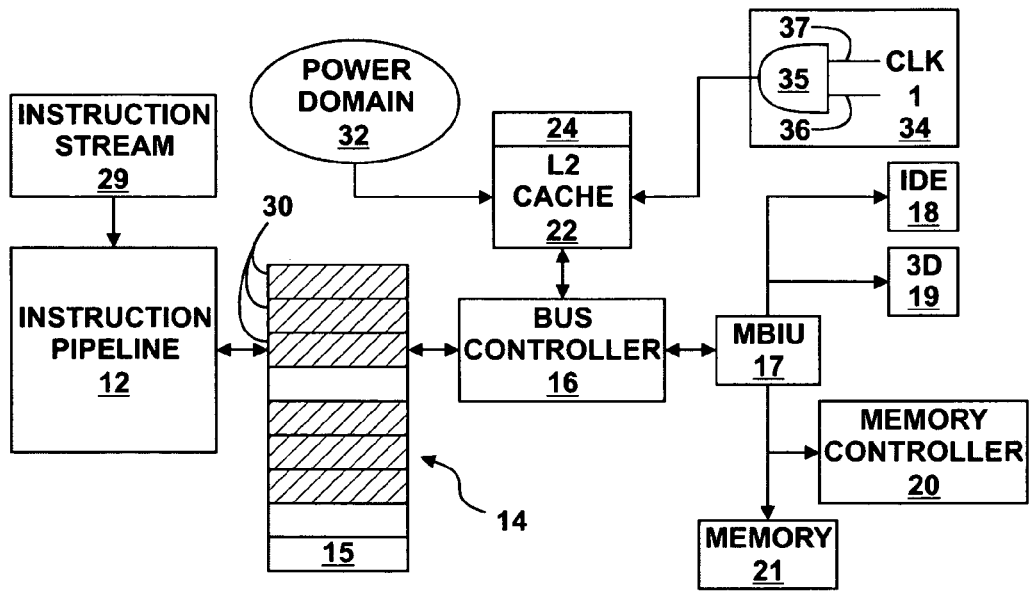
FIG. 3 is a block diagram of the exemplary processor of FIG. 1 during a higher utilization of a lower level cache in accordance with at least one embodiment of the present disclosure.
Figure 4:
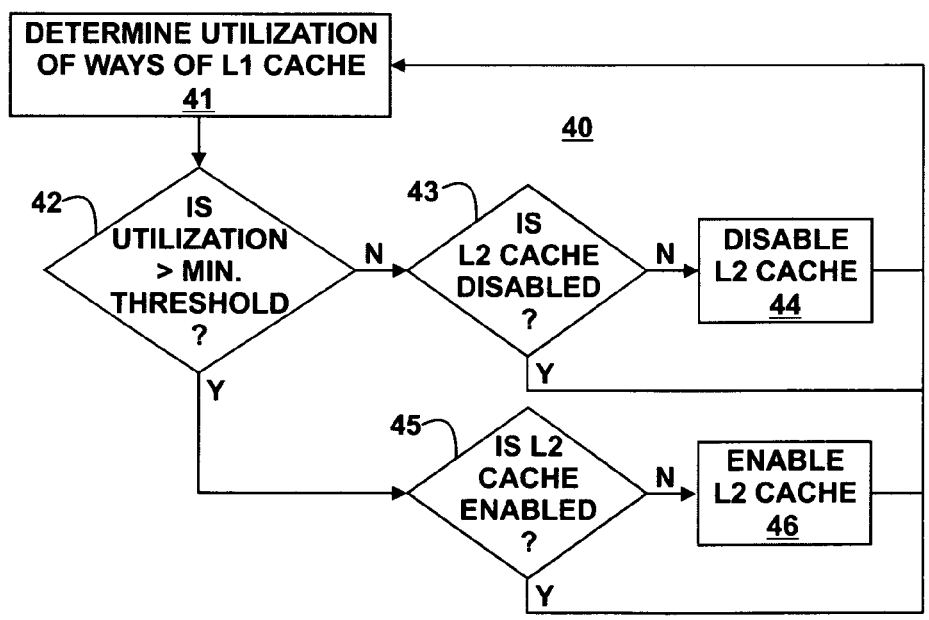
FIG. 4 is a flow diagram of an exemplary method for enabling and disabling a higher level cache based on a utilization of a lower level cache in accordance with at least one embodiment of the present disclosure.

Referring now to FIGS. 2-4, an exemplary technique for enabling and disabling a higher level cache based on a utilization of the ways of one or more N-way set associative lower level caches is illustrated in accordance with at least one embodiment of the present disclosure. FIG. 2 illustrates an exemplary instance wherein the ways 30 (eight ways in the illustrated example) of the L1 cache 14 are lightly utilized (e.g., only three of the eight ways utilized) by an instruction stream 28 executed by the instruction pipeline 12. FIG. 3 illustrates an exemplary instance wherein the ways 30 of the L1 cache 14 are heavily utilized (e.g., seven of the eight ways 30 utilized) by an instruction stream 29 executed by the instruction pipeline 12. FIG. 4 illustrates a technique for enabling or disabling the L2 cache 22 in the exemplary contexts of FIGS. 2 and 3.

The method 40 of FIG. 4 initiates at step 41 wherein the utilization of the ways 30 of the L1 cache 14 is determined. In one embodiment, the L1 cache manager 15 monitors the L1 cache 14 to determine which ways 30 of the L1 cache 14 are used by or expected to be used by an instruction stream (e.g., instruction streams 28 and 29 of FIGS. 2 and 3, respectively) executed by the instruction pipeline 12. From the number of ways 30 utilized and the total number of ways 30 of the L1 cache 14, the L1 cache manager 15 can estimate the effective utilization of the L1 cache 14 as the proportion of the used ways 30 to the total number of ways 30. In the example of FIG. 2, three of eight ways 30 of the L1 cache 14 are utilized by the instruction stream 28, so the proportion of used ways to total ways is 3 to 8, which represents a maximum 37.5% L1 cache utilization. Similarly, in the example of FIG. 3, seven of eight ways 30 of the L1 cache 14 are utilized by the instruction stream 29, so the proportion of used ways to total ways is 7 to 8, which represents a maximum 87.5% L1 cache utilization.

It will be appreciated that the utilization of the ways 30 of the L1 cache 14 may be interpreted as an indication of the likely utilization of the L2 cache 22 by the current instruction stream, and thus may be interpreted as related to the predicted hit rate of the L2 cache 22 during execution of the current instruction stream. To illustrate, a relatively low utilization of the ways 30 of the L1 cache 14 by an instruction stream typically indicates that the L1 cache 14 is sufficient to cache most or all of the instruction data needed during the execution of the instruction stream, so L2 cache access are unlikely to occur. Conversely, a relatively high utilization of the ways 30 of the L1 cache 14 by an instruction stream typically indicates that the L1 cache 14 may be insufficient to cache most of the instruction data and the L2 cache 22 therefore is likely to cache a significant portion of the instruction data, and therefore is likely to be accessed with some frequency during the execution of the instruction stream.

Accordingly, at step 42 the estimated utilization of the L1 cache 14 is compared with a predetermined threshold. In one embodiment, the threshold represents a balance between the power consumption and latency penalty of potential missed accesses when the L2 cache 22 is maintained in an enabled state and the power savings and latency penalty of external memory accesses when the L2 cache 22 is maintained in a disabled state. The threshold may be set to an arbitrary value or determined, for example, by an empirical analysis of the execution of one or more representative applications executed by the processor 10 using different threshold values. Moreover, in one embodiment, the efficiency resulting from a particular threshold value may be monitored and the threshold value changed accordingly.

If the utilization of the L1 cache 14 is less than the predetermined threshold (i.e., the L2 cache 22 is expected to be accessed relatively infrequently), the L2 cache manager 24 determines whether the L2 cache is disabled at step 43. If the L2 cache 22 is not already disabled, the L2 cache manager 24 initiates the disablement of the L2 cache 22 at step 44. Otherwise, the method 40 returns to step 41.

If the utilization of the L1 cache 14 is greater than the predetermined threshold (i.e., the L2 cache is expected to be accessed relatively frequently), the L2 cache manager 24 determines whether the L2 cache 22 is enabled at step 45. If the L2 cache 22 is enabled, the method 40 returns to step 41. Otherwise, the L2 cache manager 24 initiates the enablement of the L2 cache 22 at step 46 and the method 40 then returns to step 41.

Any of a number of techniques may be used to disable or enable the L2 cache 22. For example, as illustrated in FIGS. 2 and 3 the L2 cache 22 may receive its power from a power domain 32 that supplies power to the L2 cache 22 and potentially one or more other components of the processor 10. Thus, to disable the L2 cache 22, the L2 cache 22 may be isolated from the power domain 32 via, for example, a switch, a transistor, a tri-state device, and the like, the L2 cache 22 may be enabled by reconnecting the L2 cache 22 to the power domain 32. An advantage to isolating the L2 cache 22 from the power domain 32 is that leakage current is reduced or eliminated in addition to the dynamic power consumption that would otherwise be consumed by the L2 cache 22 in an idle state. As another example, the L2 cache 22 could be enabled or disabled by a clock gating module 34 that provides a clock signal 37 to the L2 cache 22 when it is enabled and provides no clock signal when the L2 cache 22 is disabled. As illustrated in FIGS. 2 and 3, the clock gating module 34 may be implemented using, for example, an AND gate 35 having as inputs the clock signal 37 and a control signal 36 provided by, for example, the L2 cache manager 24. Although two exemplary techniques for enabling and disabling the L2 cache 22 are illustrated, those skilled in the art may implement alternate techniques using the guidelines provided herein without departing from the spirit or the scope of the present disclosure.

As method 40 illustrates, the relative utilization of the ways 30 of the L1 cache 14 may be used as an estimate of the likely use of the L2 cache 22 and based on this estimate, the L2 cache 22 may be disabled, thereby reducing power consumption and latency by avoiding L2 cache accesses, or the L2 cache 22 may be enabled, thereby reducing the latency involved in external memory accesses.

Figure 5:
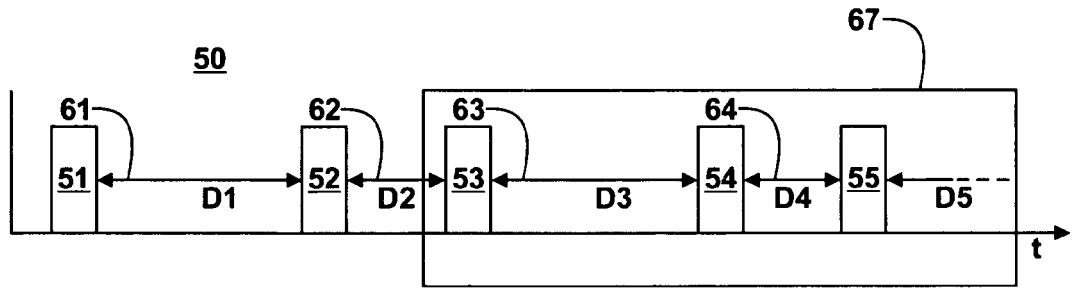
FIG. 5 is a block diagram illustrating exemplary techniques for determining a representative duration between a series of suspend operations of a processor in accordance with at least one embodiment of the present disclosure.
Figure 6:
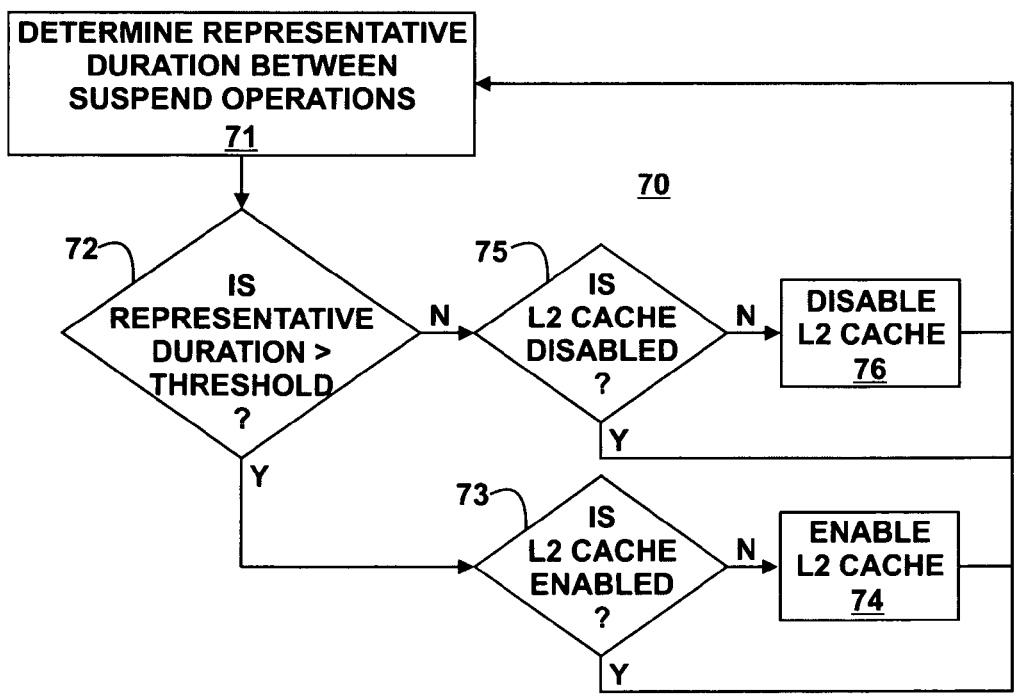
FIG. 6 is a flow diagram illustrating an exemplary method for enabling and disabling a higher level cache based on a representative duration between suspend operations in accordance with at least one embodiment of the present disclosure.

Referring now to FIGS. 5 and 6, an exemplary technique for enabling or disabling the L2 cache 22 based on a frequency of occurrence of suspend operations or another predetermined instruction is illustrated in accordance with at least one embodiment of the present disclosure. As illustrated by the timing diagram 50 of FIG. 5, processors often may intermittently or periodically execute one or more suspend operations, such as suspend operations 51-55. The suspend operations 51-55 typically represent actions taken by the processor during periods of relative inactivity. For example, the Windows® XP® operating system implements a suspend-on-halt instruction whereby most of the logic of the processing pipes of the processor 10 are clock gated or isolated from one or more power domains. In one embodiment, the exemplary method 70 of FIG. 6 utilizes a representative duration between these suspend operations to determine whether to enable or disable the L2 cache.

The method 70 initiates at step 71 wherein the representative duration between suspend operations is determined. In one embodiment, the representative duration may represent, for example a frequency of occurrence of suspend operations in a certain trailing time window 67 or an average duration between suspend operations for the trailing time window 67, e.g., the average of the durations 61-64 between suspend operations 51-55, respectively. The representative duration therefore may be measured in, for example, a count of suspend operations or in clock cycles.

In general, the frequency of suspend operations may be indicative of the relative cache activity, whereby numerous suspend operations may indicate that the processor 10 is frequently idle and therefore not likely to access the L1 cache 14, and vice versa. It therefore will be appreciated that the duration between suspend operations may be interpreted as an estimation of the utilization of the L1 cache 14 (FIG. 1) because the utilization of the L1 cache 14 typically increases as the duration between suspend operations increases, and vice versa. Accordingly, at step 72, the representative duration is compared with a predetermined threshold, where the predetermined threshold, in one embodiment, represents a balance between the advantages (reduced power consumption, reduced cache miss latency) of a disabled L2 cache 22 and the advantages of an enabled L2 cache (reduced external memory access latency). The predetermined threshold may be selected arbitrarily or by empirical analysis of various potential threshold values.

If the representative duration 72 is greater than the predetermined threshold, the L2 cache manager 24 determines whether the L2 cache 22 is enabled at step 73, and if disabled, initiates the enablement of the L2 cache 22 at step 74. If the representative duration is less than the predetermined threshold, the L2 cache manager 24 determines whether the L2 cache 22 is disabled at step 75. If not, the L2 cache manager initiates the disablement of the L2 cache 22 at step 76. As noted above, the L2 cache 22 may be disabled by, for example, isolating the L2 cache 22 from a power domain or by clock gating the L2 cache 22. As demonstrated by method 70, the duration between suspend operations may be monitored as representation of the L1 cache 14 so as to determine whether it is more advantageous from a power and/or latency perspective to enable or disable the L2 cache 22.

Figure 7:
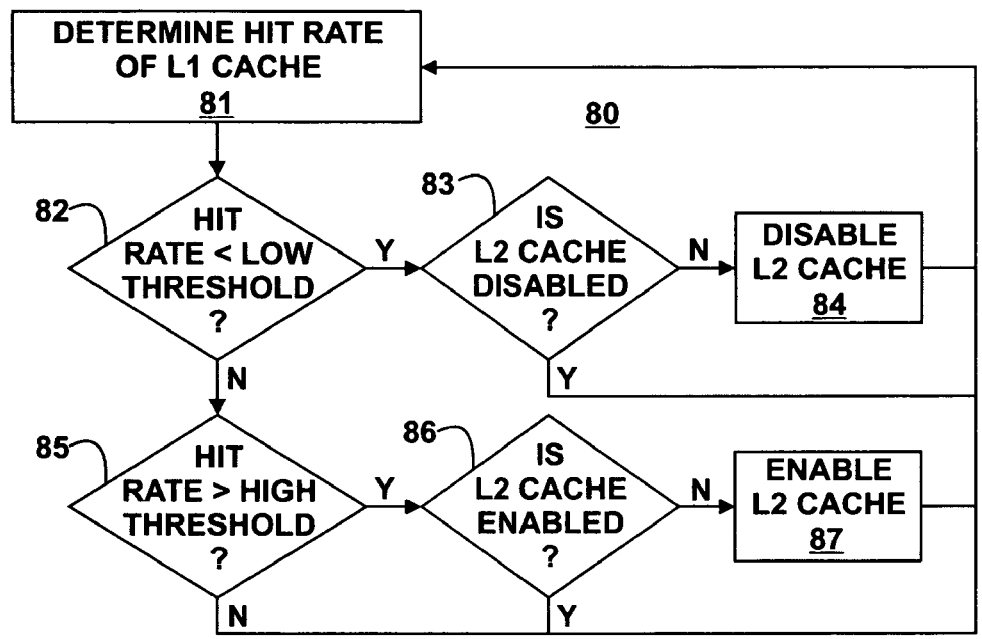
FIG. 7 is a flow diagram illustrating an exemplary method for enabling and disabling a higher level cache based on a hit rate of one or more lower level caches in accordance with at least one embodiment of the present disclosure.

Referring now to FIG. 7, an exemplary method 80 for enabling or disabling the L2 cache 22 based on the hit rate of one or more lower level caches is illustrated in accordance with at least one embodiment of the present disclosure. At step 81, the hit rate of a lower level cache, such as the L1 cache 14, is determined. As will be understood by those skilled in the art, the hit rate represents the ratio of successful cache accesses to total cache access (both successful and unsuccessful). As with the utilization of the ways of the L1 cache 14 or the duration between suspend operations as discussed above, the hit rate of the L1 cache 14 may be used to estimate the likely utilization of the L2 cache 22 and therefore determine whether the L2 cache 22 is to be enabled or disabled. At step 82, the hit rate is compared to a lower threshold. If the hit rate is less than the lower threshold, the L2 cache manager 24 determines whether the L2 cache 22 is disabled at step 83. If not, the L2 cache manager 24 initiates the disablement of the L2 cache 22 at step 84. If the hit rate is greater than the lower threshold, the hit rate is compared to a higher threshold at step 85. If the hit rate is greater than the higher threshold, then the L2 cache manager 24 determines whether the L2 cache 22 is enabled at step 86, and if no, initiates the enablement of the L2 cache at step 87.

Figure 8:
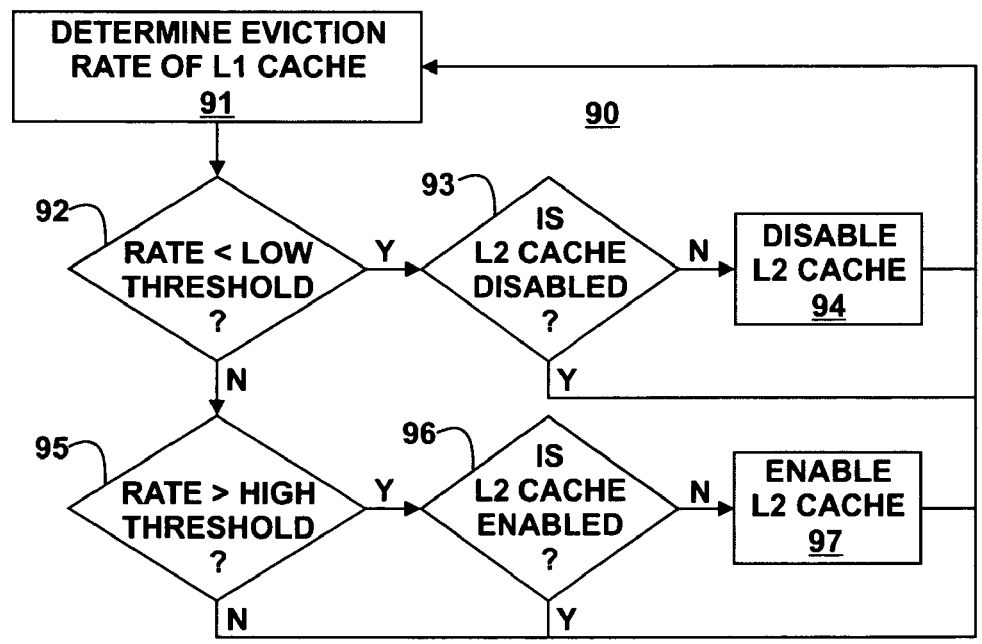
FIG. 8 is a flow diagram illustrating an exemplary method for enabling and disabling a higher level cache based on an eviction rate of one or more lower level caches in accordance with at least one embodiment of the present disclosure.

Referring now to FIG. 8, an exemplary method 90 for enabling or disabling the L2 cache 22 based on the eviction rate of one or more lower level caches is illustrated in accordance with at least one embodiment of the present disclosure. At step 91, the eviction rate of a lower level cache, such as the L1 cache 14, is determined (e.g., by the L1 cache manager 15). As will be understood by those skilled in the art, the eviction rate represents the ratio of successful cache accesses to total cache access (both successful and unsuccessful). As with the utilization of the ways of the L1 cache 14 or the duration between suspend operations as discussed above, the eviction rate of the L1 cache 14 may be used to estimate the likely utilization of the L2 cache 22 and therefore determine whether the L2 cache 22 is to be enabled or disabled. At step 92, the eviction rate is compared to a lower threshold. If the eviction rate is less than the lower threshold, the L2 cache manager 24 determines whether the L2 cache 22 is disabled at step 93. If not, the L2 cache manager 24 initiates the disablement of the L2 cache 22 at step 94. If the eviction rate is greater than the lower threshold, the eviction rate is compared to a higher threshold at step 95. If the eviction rate is greater than the higher threshold, then the L2 cache manager 24 determines whether the L2 cache 22 is enabled at step 96, and if no, initiates the enablement of the L2 cache at step 97.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A method comprising:
   determining a representative duration between occurrences of a predetermined instruction executed by a processor; and
   disabling a cache of the processor when the representative duration exceeds a first predetermined threshold.

2. The method of claim 1, wherein disabling the cache comprises clock gating the cache.

3. The method of claim 1, wherein disabling the cache comprises isolating the cache from a power domain.

4. The method of claim 1, further comprising:
enabling the cache when the representative duration exceeds a second predetermined threshold.

5. The method of claim 1, wherein the cache comprises a L2 cache.

6. The method of claim 1, wherein the predetermined instruction includes a suspend operation.

7. The method of claim 6, wherein the suspend operation includes a suspend-on-halt operation.

8. The method of claim 1, wherein the representative duration includes one of an average duration between the occurrences of the predetermined instructions or a count of the occurrences of the predetermined instructions within a predetermined sliding time window.

9. A method comprising:
disabling a second cache of a processor when an eviction rate of a first cache of the processor exceeds a first predetermined threshold; and
enabling the second cache when the eviction rate of the first cache exceeds a second threshold.

10. The method of claim 9, wherein disabling the second cache comprises clock gating the second cache.

11. The method of claim 9, wherein disabling the second cache comprises isolating the second cache from a power domain.

12. The method of claim 9, wherein the first cache is accessed by the processor before the second cache.

13. The method of claim 12, wherein the first cache is a L1 cache and the second cache is a L2 cache.

14. A processor comprising:
a cache; and
a cache controller operably coupled to the cache, the cache controller to:
determine a representative duration between a sequence of suspend operations executed by the processor; and
initiate a disablement of the cache when the representative duration exceeds a first predetermined threshold.

15. The processor of claim 14, wherein initiating the disablement of the cache comprises initiating a clock gating of the cache.

16. The processor of claim 15, wherein initiating the disablement of the cache comprises initiating an isolation of the cache from a power domain.

17. The processor of claim 15, wherein the cache controller is further to:
initiate an enablement of the cache when the representative duration exceeds a second predetermined threshold.

18. The processor of claim 15, wherein the cache comprises a L2 cache.

19. The processor of claim 15, wherein the predetermined instruction includes a suspend operation.

20. The processor of claim 19, wherein the suspend operation includes a suspend-on-halt operation.

21. The processor of claim 15, wherein the representative duration includes one of an average duration between the occurrences of the predetermined instructions or a count of the occurrences of the predetermined instructions within a predetermined sliding time window.

22. A processor comprising:
a first cache having a plurality of ways;
a second cache; and
a cache controller operably coupled to the first cache and the second cache, the cache controller to:
initiate a disablement of the second cache when an eviction rate of the first cache exceeds a first predetermined threshold; and
initiate an enablement of the second cache when the eviction rate of the first cache exceeds a second threshold.

23. The processor of claim 22, wherein initiating the disablement of the second cache comprises initiating a clock gating of the second cache.

24. The processor of claim 22, wherein initiating the disablement of the second cache comprises initiating an isolation of the second cache from a power domain.

25. The processor of claim 22, wherein the first cache is accessed by the processor before the second cache.

26. The processor of claim 25, wherein the first cache is a L1 cache and the second cache is a L2 cache.

* * * * *